Figure 1:
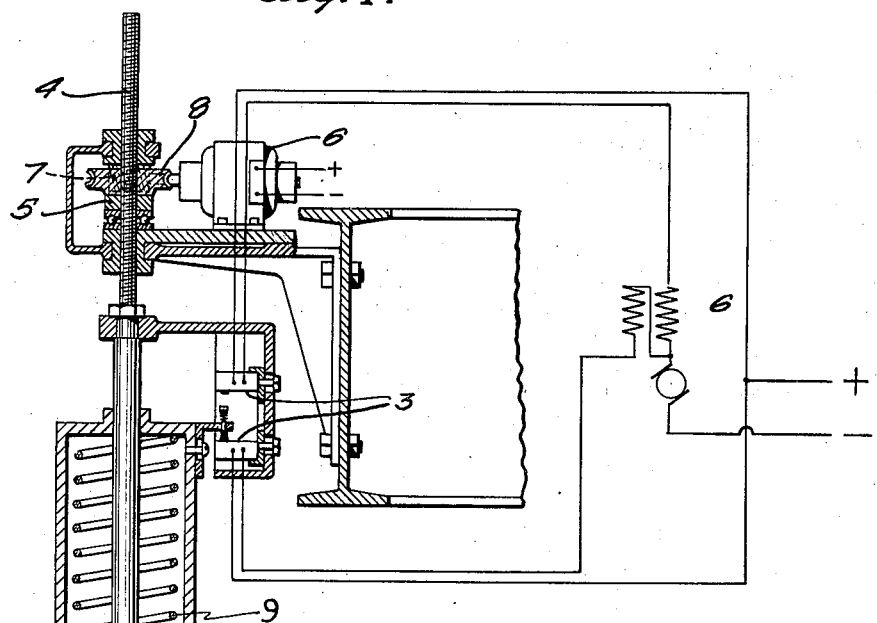

July 8, 1941.  J. K. WOOD  2,248,730

SUPPORT DEVICE

Filed Sept. 23, 1938

INVENTOR
JOSEPH KAYE WOOD
ATTORNEYS

Patented July 8, 1941

2,248,730

UNITED STATES PATENT OFFICE 2,248,730

SUPPORT DEVICE

Joseph Kaye Wood, Bronx, N. Y., assignor to General Spring Corporation, New York, N. Y., a corporation of New York Application September 23, 1938, Serial No. 231,303

8 Claims. (Cl. 248—54)

This invention relates to hangers which maintain constant support while allowing free travel of the object being supported.

The use of spring devices for supporting piping and other apparatus subject to limited movement has in the past been attended by certain difficulties such as vibration, variation of supporting force, limited travel, and other kindred troubles. In my prior applications I have shown ways of constructing such supports, e. g., pipe hangers, to overcome these troubles without lessening the effectiveness of the device, and these expedients have been eminently successful.

My prior applications, Serial Nos. 117,265, filed December 23, 1936, Patent No. 2,208,064 of July 16, 1940 and 20,511, filed May 9, 1935, Patent No. 2,145,704 of January 31, 1939 and my Patents Nos. 1,816,164, dated July 28, 1931, and 1,937,135, dated November 28, 1933, describe systems of springs and/or other resilient elements combined with leverage varying devices in such a manner as to produce a support affording constant supporting force through a predetermined free travel distance. It may, however, be desirable to have a greater free travel distance than such spring devices may accommodate, or it may be desirable to produce a substitute for such spring supporting devices with reduction to a desired extend or control of the hysteresis effect due to friction, or space considerations may prevent the use of such spring devices.

It is an object of my present invention to produce a supporting device which combines desirable features of my prior spring devices, including simplicity, low cost, compactness, but which is not dependent upon extension and contraction of springs to accommodate the necessary movement, but instead may use this extension or contraction to control the desired movement.

This application is a continuation in part of my prior application, Serial No. 117,265, filed December 23, 1936. In that application I have disclosed the use of a reversible electric motor and control contacts in conjunction with a spring device to assist in maintaining a steady supporting force. This device, according to my invention, however, may be used either with or without the spring device; and there is advantage in using this novel construction with the electric motor and contacts arranged to supplant the springs and friction devices of my earlier inventions.

In the accompanying drawing and the following description I have shown and described a preferred embodiment of my invention and various modifications thereof. It is to be understood that these are not intended to be exhaustive or limiting of the invention, but on the contrary are chosen and set forth for the purpose of illustrating the invention and instructing others in the principles thereof, and in the best manner of embodying and using the same in practice so that others may be enabled to modify and adapt the invention and to embody it in numerous forms, each as may be best suited to the circumstances of a particular use.

Figure 2:
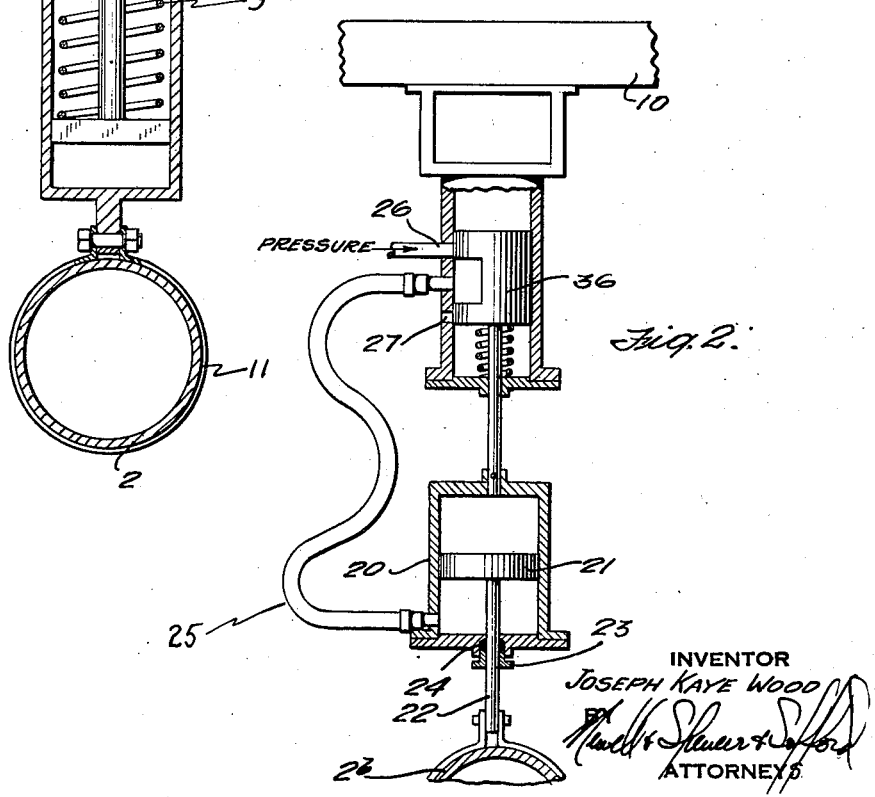

In the drawing:

Fig. 1 shows a view partly in elevation and partly in section of a preferred form of my device; and Fig. 2 shows a view partly in elevation and partly in section of an alternative form of my invention using a fluid pressure motor.

In the embodiment of my invention shown in Fig. 1, the pipe or other supported object 1 is hung by an ordinary strap hanger 2 through a force responsive means, for example, a contact making spring scale 3 from an adjustable support, for example, the main screw 4. This screw is elevated or lowered by means of the nut 5 which is driven by the motor means, for example, the electric motor 6, through the speed reducing worm and worm gear 7—8. The operation of the motor is controlled by the force-responsive control means, for example, the contacts 3, which close at a predetermined increase in the load on the spring 9, causing the motor to turn in such a direction as to lower the screw, and which closes at a predetermined reduction in the load on the spring 9, causing the motor to turn in such a direction as to raise the screw. The motor itself is anchored to the fixed anchor, for example, the girder 10. By making the gear ratio between the motor and the load carrying screw very high and/or the pitch of the screw low, the motor may be required to make several hundreds or even thousands of revolutions to raise or lower the load one inch. In this way, any tendency of the support to "hunt" (i. e., to go beyond the desired balance and close the opposite contacts) obviously is avoided, and a motor of very low power may be used.

The motor is shown in the schematic circuit as being a double field reversing motor of the D. C. type. This is, of course, merely illustrative, and it might be more advantageous to use a motor having a single field and to reverse the field leads, or to use a three-phase alternating current motor and to reverse one phase, or in fact to use any of the expedients known to the electrical engineering art. The use of a two field reversing motor is advantageous in that only single contacts need be provided to operate the motor in either direction, thus keeping the control mechanism to a minimum.

The total free travel of the support and, therefore, the pipe or other load, is limited only by the length of the lifting screw and, therefore, by the space consideration of the location where it is to be used. Since lifting screws may be employed of any length, the free travel may be from a fraction of an inch to several feet or more, and with only the slightest variation in supporting force. Where space requirements demand it other mechanical devices may be used, for example, a gear sector and arm instead of the nut and screw. If necessary to obtain additional travel or supporting force, mechanical advantage, e. g., a system of levers may be employed between the hanger and the piping itself.

A further advantage of this structure is its complete lack of any frictional characteristic. Since the motor control is directly connected to the load, the contacts may be set for a few pounds separation, or these contacts may be set so as to give limits of any range of supporting forces within the capacity of the device. If, for example, it was desired to support a 1500 pound load, the limits might be set at 1480 and 1520, so that as soon as the supporting force reached these values the motor would become effective to raise or lower the support until the force was once again within the 1480-1520# limits, at which time the contact would open, and the system remain in stable equilibrium. It would be possible to adjust the limits to be but a few pounds apart, i. e., 1498-1502; but then any slight variations in weight due to incidental and temporary outside causes, e. g., the resting of the weight of a tool, etc., on the pipe, might cause it to move to a new position, which condition might be undesirable. It is, therefore, preferable to make the range of force sufficient to allow for such temporary deviations of force exerted by the load.

It will be understood, of course, that the difference in the sustaining force between the positions at which contact occurs for an upward and a downward movement of the supported object, respectively, provides a region between, where neither action will occur. This region may be made small, but if it is made too small, the adjusting device will tend to "hunt" back and forth.

The embodiments of my invention shown and described are only illustrative of ways in which the invention may be used. The weighing contactor may, for example, readily be placed between the hanger and the supporting beam, and the pipe or other supported object hung directly from the screw. In place of the main supporting screw any mechanical arrangement giving high mechanical advantage and preferably one which holds a given position against the load without aid of the motor, may be placed between the load and motor. The contact making mechanism may preferably have a toggle action and/or snap action, so as to provide quick make and break and decrease contact corrosion. It is advantageous to use mercury switches to prevent sparking at the contacts and corrosion, particularly if the support is to be used in location where exposed to inflammable vapors, such as in oil refineries, etc., or where open contacts might be subject to corrosive compounds, as shown in Fig. 1 where enclosed mercury contacts are used.

In place of electrical contacts photocell control may be substituted. In this control the force responsive device may act to break a beam of light to a photocell when the force gets outside the set limits. If the force exceeds an upper limit, the beam to a high limit photocell is broken, and if it becomes less than a lower limit the beam to a low limit photocell is broken. The same source of light may be used for both photocells so that failure of the light source does not result in any movement of the motor. It is desirable to fixedly mount the force-responsive means on the anchorage, as shown in Fig. 2, so that movement of the motor would not affect operation of the control.

In the above description an electric motor has been mentioned as the specific means used to operate the adjusting device. It may be found, however, that it is more convenient to use a fluid pressure or other type motor under certain circumstances, and in this case a valve may be substituted for the electrical contacts.

This I have illustrated in Fig. 2, in which the force-responsive means, in this case a valve action 36, is supported directly by the anchorage 10. Between this force-responsive means and the support 2b for the supported object 16 is a cylinder 20 with a piston 21. The piston is connected to the load 2b through the piston rod 22, which is maintained in airtight relation with the atmosphere by the packing gland 23 and packing 24. Connected with the cylinder is a pipe 25 which is directly connected with the valve ports of the force-responsive control means 26 and 27. The valve port 26 opens in response to too light a load and connects the main supply of fluid pressure to the cylinder, raising the pressure in the cylinder and lifting the piston and load until the force is increased sufficiently to cause the force-responsive means to close the valve. Conversely, valve port 27 is responsive to the load increasing beyond the predetermined point, and opens to the atmosphere, allowing the pressure in the cylinder to be reduced with a resultant dropping of the piston and re-establishment of equilibrium at the force-responsive means. In this manner, the cylinder pressure is kept constant, and with it the supporting force, no matter the position to which the pipe moves within the limits of the device.

It may also be desirable to relieve the adjustable member of at least a part of the weight of the load. This may be accomplished by paralleling the adjustable member by a spring or spring device. The spring in this case is parallel only to the adjustable member and is connected to the load through the force-responsive member, e. g., as described in my prior copending application, Serial No. 117,265.

What I claim is:

1. A pipe hanger for high temperature, high pressure piping adapted to maintain a predetermined supporting force through a limited range of movement induced by thermal expansion and contraction, which comprises a jack for extending or retracting the length of the hanger between the pipe line and a fixed anchor, means for actuating said jack, means actuated by a change in load for controlling the operation of said jack actuating means to vary the length of the hanger between the pipe line and the fixed anchor when the force between them is varied beyond predetermined limits by controlling a supply of operating energy to the jack whereby to restore the force within the predetermined limit.

2. A device for exerting a constant supporting force on an object through a limited range of movement of the object, comprising means for anchoring the device to a fixed support, means for supporting the object, means adjustably connecting the supporting means and the anchoring means, motor means to adjust said adjustable connecting means and a force-responsive motor control means and a connection between said force responsive control means and the motor means, the force responsive control means causing operation of the motor means when the force exerted on said object exceeds a given value so as to reduce the force, and causing operation of the motor means when the force goes below a given value to increase the force, whereby to maintain a substantially constant supporting force.

3. A device for exerting a constant supporting force on an object through a limited range of movement of the object which comprises in combination anchoring means, support means attached to the object, an electrically operated adjustable connecting means connecting the fixed anchoring means and the support means and a contact-making force-responsive device located between the fixed anchoring means and the support means to control said electrically operated adjustable connecting means to maintain a substantially constant supporting force on the object.

4. In a device for supporting high temperature piping with constant sustaining force irrespective of the position of the pipe, the combination of an anchorage, a support attached to the pipe, and an intermediate adjustable means, which consists of a screw-and-nut jack, a motor connected to the jack to effect relative turning between the screw and the nut of said jack, and means responsive to the sustaining force adapted to control operation of said motor whereby to adjust said jack to always maintain said sustaining force substantially at a constant value.

5. A device as defined in claim 2, in which the motor means is an electric motor and the force responsive means is a spring scale operated mercury switch.

6. A pipe hanger for high temperature high pressure piping as described in claim 1, in which the means actuated by a change in load comprises a spring connected to said jack in series therewith and energy control means for controlling the operation of the jack responsive to variations from a predetermined length of said spring.

7. In a device for supporting high temperature piping with constant sustaining force irrespective of the position of the pipe, the combination of an anchorage, a support attachment to the pipe, and an intermediate adjustable means which consists of a fluid pressure motor, and a source of fluid under pressure to operate said motor, and means responsive to the sustaining force adapted to govern the admission and release of fluid to the cylinder whereby to adjust the quality of fluid in said cylinder to always maintain said sustaining force substantially at a constant value.

8. A pipe hanger for high temperature high pressure piping and adapted to maintain a constant supporting force through a limited range of movement comprising means for anchoring the piping to a fixed support, adjustable means connecting the piping and the anchoring means, motor means to adjust said adjustable connecting means, a force responsive motor control means connected between said anchor means and said piping and a point of reference with respect to which the position of the piping is to be maintained, the connection form said control means to said piping being free from substantial friction which would introduce hysteresis in the response of said motor control means to variations of force, and a connection between said force responsive control means and the motor means for causing operation of the motor means when the force exerted on said object exceeds a given value so as to reduce the force, and causing operation of the motor means when the force goes below a given value to increase the force, whereby to maintain a substantially constant supporting force.

JOSEPH KAYE WOOD.

CERTIFICATE OF CORRECTION.

Patent No. 2,248,730. July 8, 1941.

JOSEPH KAYE WOOD.

It is hereby certified that error appears in the printed specification of the above numbered patent requiring correction as follows: Page 1, first column, line 29, for the word "extend" read --extent--; page 3, second column, line 19, claim 7, for "quality" read --quantity--; line 33, claim 8, for "form" read --from--; and that the said Letters Patent should be read with this correction therein that the same may conform to the record of the case in the Patent Office.

Signed and sealed this 16th day of September, A. D. 1941.

(Seal)

Henry Van Arsdale,
Acting Commissioner of Patents.